US010719117B2

(12) United States Patent
Goda

(10) Patent No.: US 10,719,117 B2
(45) Date of Patent: Jul. 21, 2020

(54) CONTROL APPARATUS CONFIGURED TO CONTROL CLOCK SIGNAL GENERATION, METHOD FOR CONTROLLING THE SAME, STORAGE MEDIUM, AND COMPUTER SYSTEM

(71) Applicant: CANON KABUSHIKI KAISHA, Tokyo (JP)

(72) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 15/988,093

(22) Filed: May 24, 2018

(65) Prior Publication Data

US 2018/0341312 A1   Nov. 29, 2018

(30) Foreign Application Priority Data

May 29, 2017   (JP) .................................. 2017-105769

(51) Int. Cl.
*G06F 1/324*   (2019.01)
*G06F 1/08*   (2006.01)
*G06F 1/3237*   (2019.01)
*G06F 1/04*   (2006.01)
*G06F 13/00*   (2006.01)

(52) U.S. Cl.
CPC ................ *G06F 1/324* (2013.01); *G06F 1/04* (2013.01); *G06F 1/08* (2013.01); *G06F 1/3237* (2013.01); *G06F 13/00* (2013.01)

(58) Field of Classification Search
CPC combination set(s) only.
See application file for complete search history.

(56) References Cited

U.S. PATENT DOCUMENTS

| 5,628,019 A | * | 5/1997 | O'Brien | ................ G06F 1/3215 713/322 |
| 6,715,017 B2 | * | 3/2004 | Sesumi | .................. G06F 13/24 710/260 |
| 2004/0205370 A1 | * | 10/2004 | McDevitt | ................. G06F 1/06 713/500 |
| 2015/0253842 A1 | * | 9/2015 | Murata | ................ G06F 1/3287 713/323 |

FOREIGN PATENT DOCUMENTS

JP    H11053049 A    2/1999

* cited by examiner

*Primary Examiner* — Raymond N Phan
(74) *Attorney, Agent, or Firm* — Rossi, Kimms & McDowell LLP

(57) ABSTRACT

The present control apparatus includes a timer for measuring a predetermined time and a clock generation circuit for supplying a clock to a peripheral device. Furthermore, the control apparatus includes a CPU for alternatingly stopping and restarting driving of the clock generation circuit based on the measuring of the predetermined time performed by the timer. On the other hand, the peripheral device includes an interrupt mask that restricts output of an interrupt signal to the control apparatus via the peripheral bus. When the driving of the clock generation circuit is to be stopped, the control apparatus sets the interrupt mask, and when the driving of the clock generation circuit is to be restarted, the control apparatus cancels the interrupt mask.

15 Claims, 5 Drawing Sheets

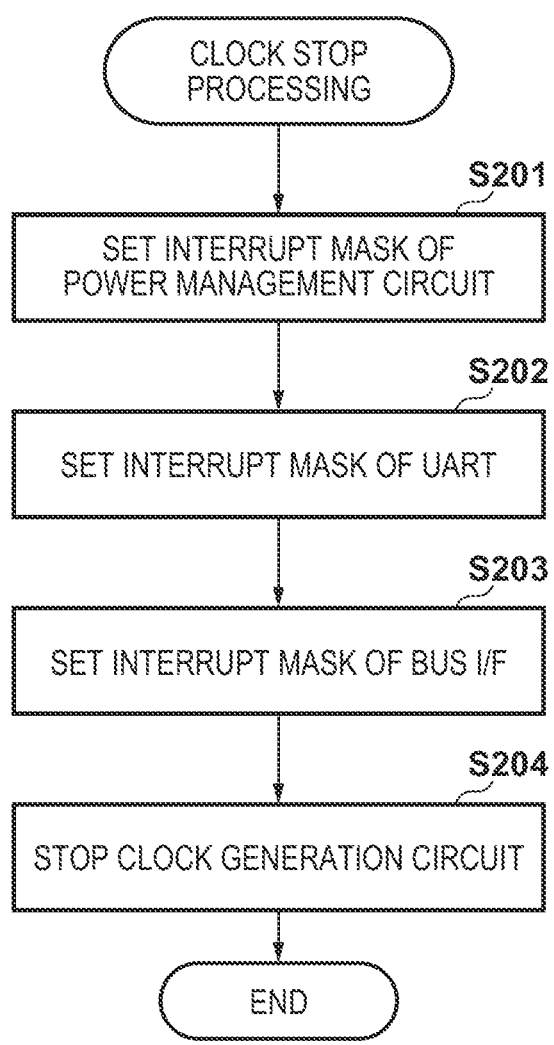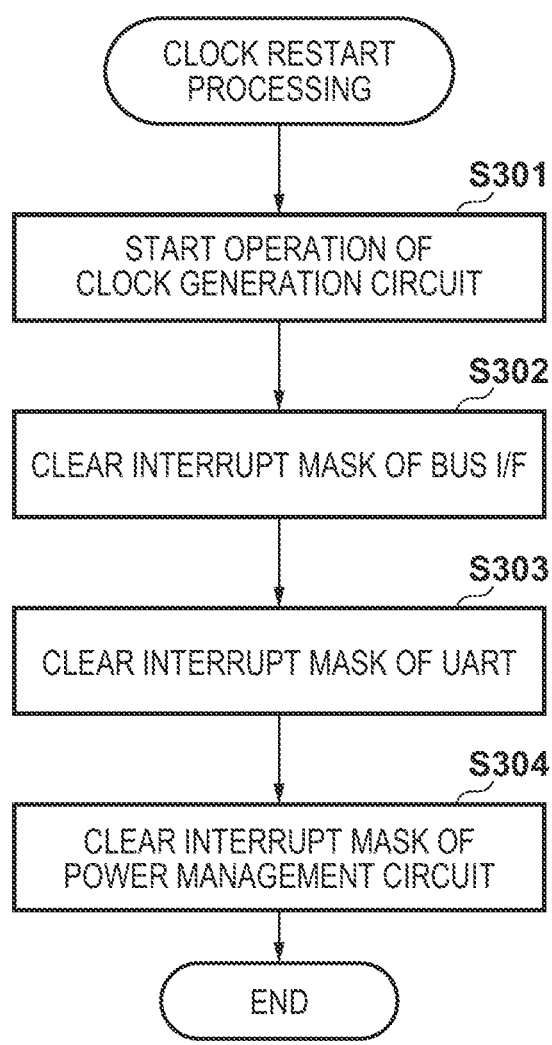

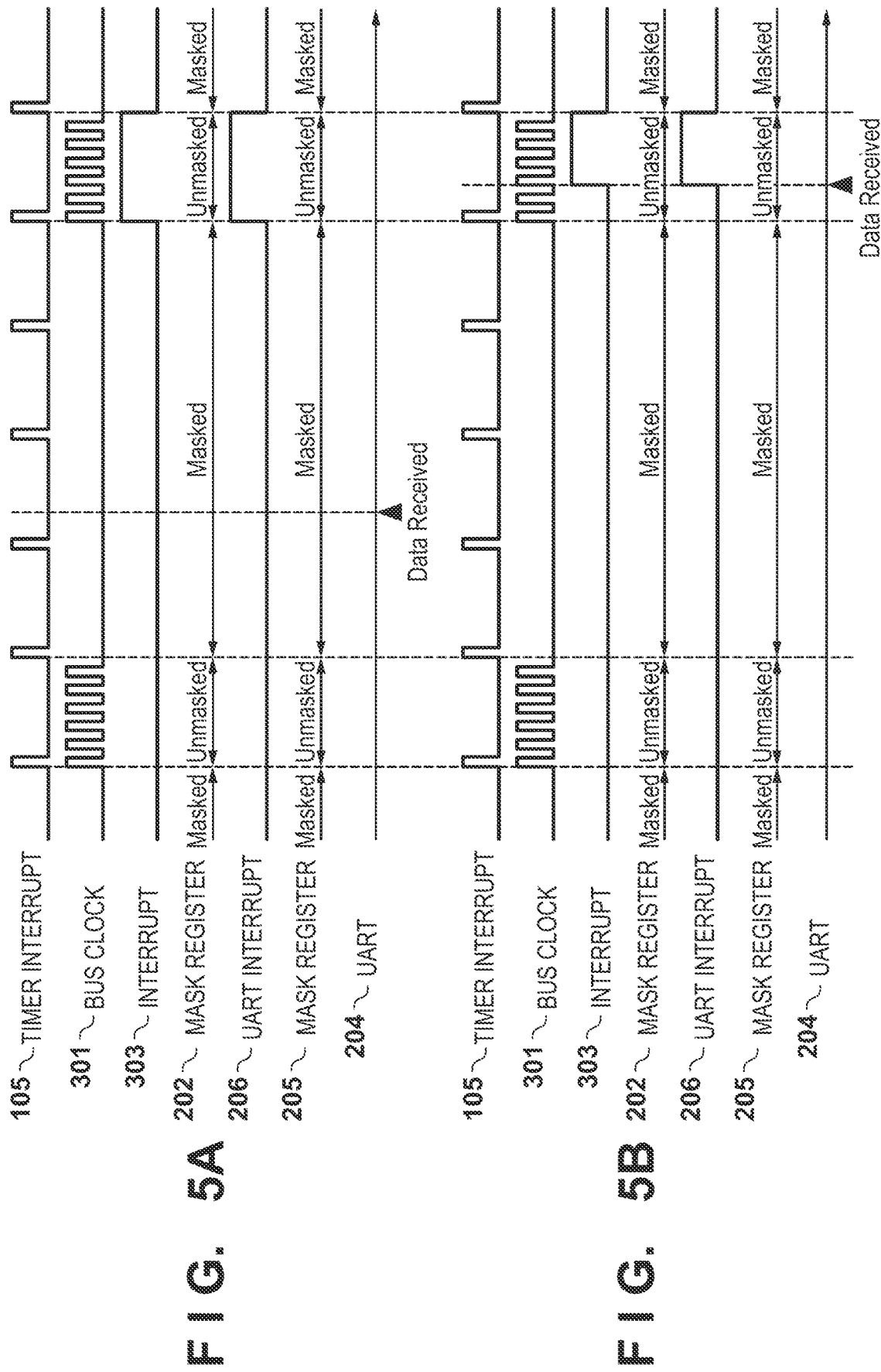

CONTROL APPARATUS CONFIGURED TO CONTROL CLOCK SIGNAL GENERATION, METHOD FOR CONTROLLING THE SAME, STORAGE MEDIUM, AND COMPUTER SYSTEM

BACKGROUND OF THE INVENTION

Field of the Invention

The present invention relates to a control apparatus, a method for controlling the same, a storage medium, and a computer system.

Description of the Related Art

When an electrical circuit is operating, its electrical components deteriorate. When the lifespan of an electrical component is exhausted, the electrical circuit can no longer be used, and therefore it is desirable that the operation time of a circuit is made as short as possible in a device that is to be used over a long period. One example of an electrical circuit with a limited lifespan is a generation circuit for a clock signal. A generation circuit for a clock signal is used also in a peripheral bus for connecting peripheral devices in a computer system including a control apparatus, and the generation circuit for the clock signal is used to supply a bus clock, which is used to synchronize transmission of digital signals between the connected devices. In order to increase the lifespan of the clock generation circuit, it is desirable that the clock generation circuit is operated as little as possible. It is preferable that instead of the bus clock always being supplied to the peripheral devices, a time during which bus clock supply is stopped is created.

Japanese Patent Laid-Open No. 11-53049 proposes a technique in which a peripheral bus is provided with a circuit for detecting whether or not the bus is idle, and if it is detected that the bus is idle, the bus clock is automatically stopped. If it is determined that the bus is not idle, supply of the bus clock is automatically restarted, and thereby stopping of the bus clock is realized without impairing the functions of the peripheral devices.

However, the above-described conventional technique has the following problems. The function of automatically stopping the bus clock in the above-described conventional technique is not provided in all types of peripheral buses. In some cases, the function of automatically stopping the bus clock is not provided in a low-cost bus technique, or the like. Although the control of the above-described conventional technique cannot be performed with a bus that does not include the function of automatically stopping the bus clock, it is desirable from the viewpoint of the lifespan to shorten the operation time of the circuit by stopping the clock signal generation circuit in an electronic device that is to be used over a long period.

On the other hand, when the supply of the bus clock to the peripheral bus is stopped, transmission of an interrupt signal is no longer possible. Many bus techniques include a function of sending an interrupt signal to a CPU of a computer system from a peripheral device connected by a peripheral bus. Since the circuit on the bus stops operating when supply of the bus clock is stopped, a state is entered in which it is not possible to transmit an interrupt signal through the peripheral bus. An interrupt signal is generally used by peripheral devices to notify a CPU of the occurrence of some kind of event according to input from the exterior, and if an interrupt signal cannot be transmitted, the computer system will enter a state of not being able to respond to input from the exterior.

With a bus technique including the automatic stop function for the bus clock, a circuit is commonly included which detects that the peripheral device on the peripheral bus is in a state of outputting interrupt signals, and restarts supply of the bus clock automatically. However, with a bus that does not include the automatic stop function, it is not possible to detect that a device on the bus is in a state of outputting an interrupt signal, and therefore it is not possible to restart supply of the bus clock when the supply is needed. For this reason, a problem to be solved lies in shortening the operation time of a clock generation circuit by stopping a bus clock, and realizing transmission of an interrupt signal through a peripheral bus, in a bus that does not include the function of automatically stopping the bus clock.

SUMMARY OF THE INVENTION

The present invention enables realization of a mechanism for reducing the operation time of a clock generation circuit by stopping the bus clock, and realizing transmission of an interrupt signal through a peripheral bus, even in the case of using a bus that does not include a function of automatically stopping the bus clock. Also, the present invention enables realization of a circuit that operates stably.

One aspect of the present invention provides a control apparatus comprising: a timer configured to repeatedly measure a predetermined time; a clock generation circuit configured to supply a clock to a peripheral device connected to the control apparatus via a bus; and a control unit configured to alternatingly stop and restart driving of the clock generation circuit based on the measuring of the predetermined time performed by the timer.

Another aspect of the present invention provides a method for controlling a control apparatus including a timer configured to repeatedly measure a predetermined time, the method comprising: supplying a clock to a peripheral device connected to the control apparatus via a bus; stopping supply of the clock supplied in the supplying, based on the measuring of the predetermined time performed by the timer; and restarting supply of the clock supplied in the supplying, based on the measuring of the predetermined time performed by the timer.

Still another aspect of the present invention provides a non-transitory computer-readable storage medium storing a computer program for causing a computer to execute steps of a method for controlling a control apparatus including a timer configured to repeatedly measure a predetermined time, the method comprising: supplying a clock to a peripheral device connected to the control apparatus via a bus; stopping supply of the clock supplied in the supplying, based on the measuring of the predetermined time performed by the timer; and restarting supply of the clock supplied in the supplying, based on the measuring of the predetermined time performed by the timer.

Yet another aspect of the present invention provides a computer system comprising a control apparatus and a peripheral device connected to the control apparatus via a bus, wherein the control apparatus includes: a timer configured to repeatedly measure a predetermined time; a clock generation circuit configured to supply a clock to the peripheral device; and a control unit configured to alternatingly stop and restart driving of the clock generation circuit based on the measuring of the predetermined time performed by the timer, the peripheral device includes an interrupt mask configured to restrict output of an interrupt signal from the peripheral device to the control apparatus via the bus, in a case where the driving of the clock generation circuit is to be stopped, the control unit sets the interrupt mask, and in a case where the driving of the clock generation circuit is to be restarted, the control unit cancels the interrupt mask.

Further features of the present invention will be apparent from the following description of exemplary embodiments with reference to the attached drawings.

BRIEF DESCRIPTION OF THE DRAWINGS

FIGS. 4A and 4B are flowcharts of bus clock stopping/restarting according to an embodiment.

FIGS. 5A and 5B are timing charts for interrupt output at a time when external input occurs, according to an embodiment.

DESCRIPTION OF THE EMBODIMENTS

Figure 1:
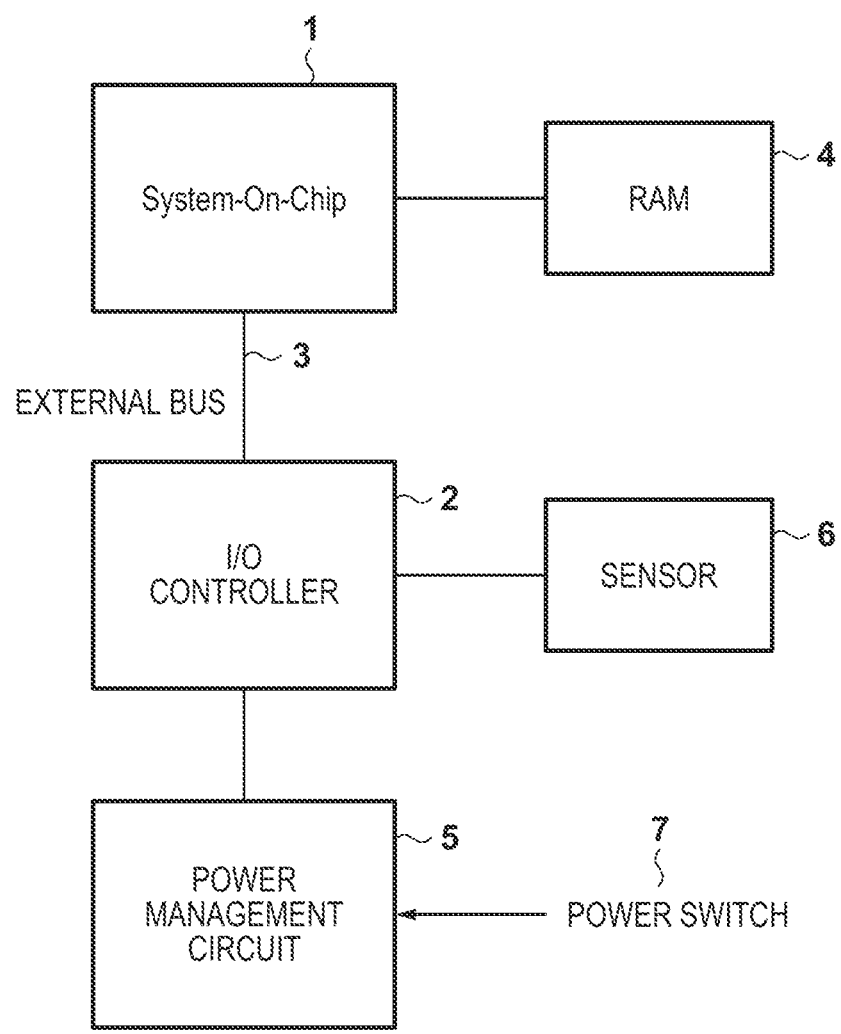
FIG. 1 is a block diagram of a computer system according to an embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Overall Configuration of Computer System

Hereinafter, an embodiment of the present invention will be described with reference to the drawings. First, an overview of the configuration of a computer system according to the present embodiment will be described with reference to FIG. 1.

The computer system includes a System-On-Chip (SoC) 1, an I/O controller 2, a RAM 4, a power management circuit 5, a sensor 6, and a power switch 7. The SoC 1 is an example of a control apparatus. However, the present invention is not limited thereto, and for example, the control apparatus may be constituted by including another component included in a computer system.

The SoC 1 is an IC chip that controls the present computer system. Various circuits including a later-described CPU 101 are integrated in the SoC 1. The I/O controller 2 is an example of a peripheral device and controls input and output of the computer system. The SoC 1 and the I/O controller 2 are connected so as to be able to communicate with each other via an external bus 3, which is a peripheral bus. The RAM 4, which is a memory used by the SoC 1 for operation, is connected to the SoC 1. A power management circuit 5 that controls electrical power to be supplied to the components of the computer system is connected to the I/O controller 2. Accordingly, the SoC 1 can control the power management circuit 5 via the external bus 3 and the I/O controller 2.

Also, a power switch 7 for turning on and off the power of the computer system is connected to the power management circuit 5. The power management circuit 5 is configured to notify the SoC 1 via the external bus 3 when the power switch 7 is operated by a user. Furthermore, a sensor 6 is connected to the I/O controller 2, and the sensor 6 is configured to output digital data to the I/O controller 2 according to input from the exterior. Note that the power management circuit 5 is an example of an external device.

Detailed Configuration of Computer System

Figure 2:
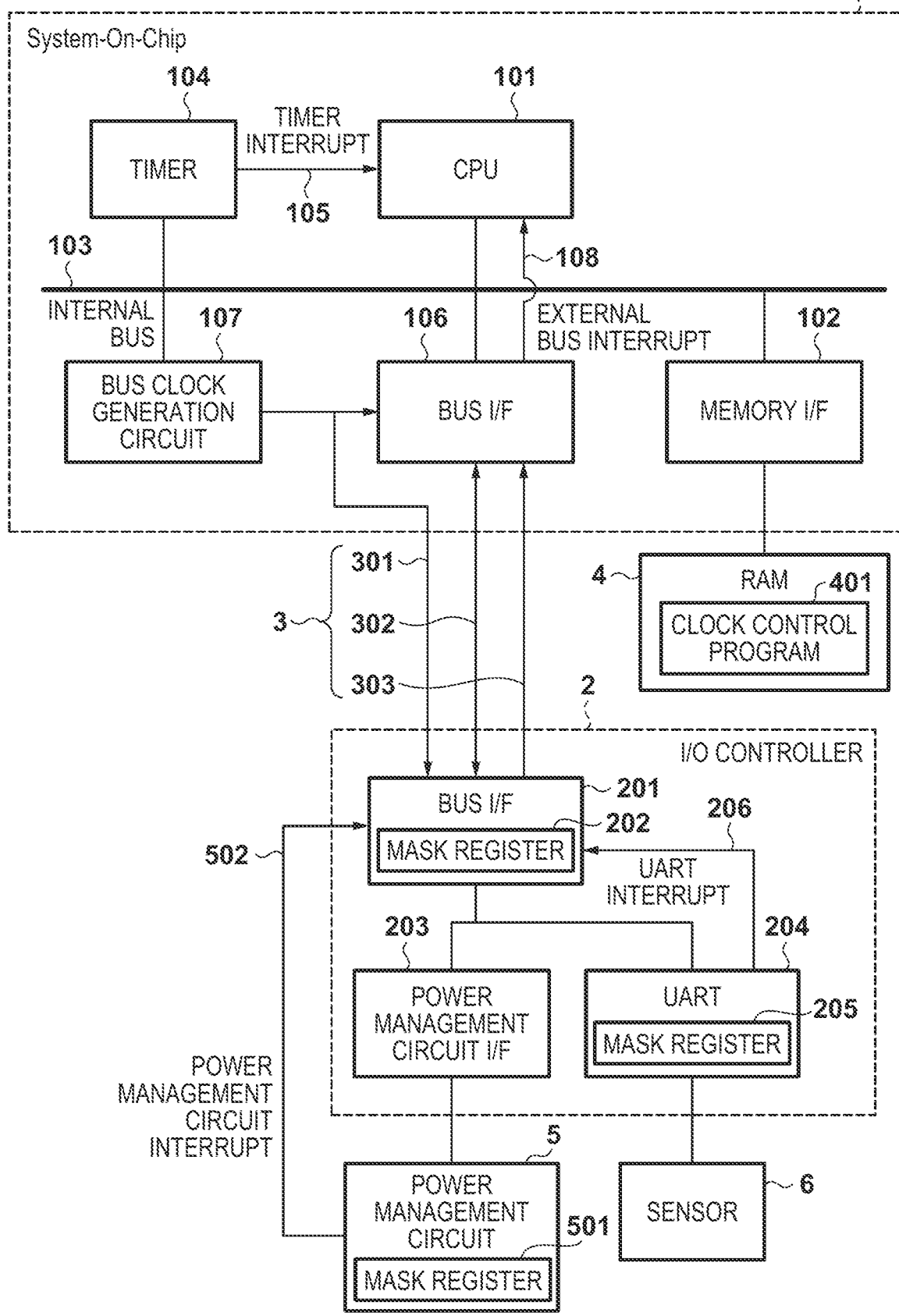
FIG. 2 is a block diagram of a periphery of a peripheral bus according to an embodiment.

Next, configurations of the external bus 3 and its periphery according to the present embodiment will be described in further detail with reference to FIG. 2. As shown in FIG. 2, the SoC 1 includes the CPU 101, a memory I/F (interface) 102, a timer 104, a bus I/F 106, and a bus clock generation circuit 107. The components are connected so as to be able to communicate with each other via an internal bus 103.

The CPU 101 performs overall control of the computer system. The CPU 101 uses the RAM 4 serving as a work region, via the memory I/F 102. A clock control program 401, which is a program that can be executed by the CPU 101, is stored in the RAM 4.

The timer 104 is a circuit that is configured to be able to output an interrupt signal each set time cycle, and the timer 104 can input a timer interrupt 105 to the CPU 101. That is, the timer 104 repeatedly measures a predetermined time, and each time the predetermined time is measured, the timer 104 inputs the timer interrupt 105 to the CPU 101. The bus I/F 106 is an interface circuit for connecting a peripheral device to the SoC 1 via the external bus 3.

The bus clock generation circuit 107 is a clock generation circuit for generating a clock signal to be supplied to the external bus 3. The bus clock generation circuit 107 can stop and restart driving (operation) according to control from the CPU 101. If the driving of the bus clock generation circuit 107 has been stopped, the bus clock is not supplied to the external bus 3.

An external bus interrupt 108 is an interrupt signal that is input to the CPU 101 when an interrupt signal is input via the external bus 3. The bus I/F 106 inputs the external bus interrupt 108 to the CPU 101 when input of a signal of an interrupt 303 is received from the external bus 3. Note that various unshown peripheral circuits, such as a storage interface and a generation circuit for a clock signal to be supplied to the CPU 101 and the like are additionally incorporated in the actual SoC 1, but description thereof is omitted since they do not influence the description of the present embodiment.

The external bus 3 is constituted by three types of signal lines for a bus clock 301, an address/data 302, and an interrupt 303. The bus clock 301 is a clock signal for synchronizing the timing of digital signals on the bus, and is supplied from the bus clock generation circuit 107. The address/data 302 is a signal used for transfer of address information and data when the CPU 101 accesses a device on the bus via the external bus 3. The interrupt 303 is a signal for transmitting an interrupt signal from a peripheral device via the external bus 3. Note that in FIG. 2, each signal is illustrated as one signal line in order to simplify the description, but in actuality, each signal may be constituted by multiple signal lines, and the present invention is not intended to be limited thereto.

The I/O controller 2 is constituted by including a bus I/F 201, a power management circuit I/F 203, and a UART (Universal Asynchronous Receiver Transmitter) 204. The bus I/F 201 is an interface for connecting the I/O controller 2 to the external bus 3. The bus I/F 201 is configured to output the signal of the interrupt 303 on the external bus 3 when at least one of a UART interrupt 206 or a power management circuit interrupt 502 is input.

Furthermore, the bus I/F 201 includes a function of masking (restricting) output of the interrupt signal. Due to the CPU 101 operating a mask register 202, it is possible to set or clear (set or cancel) the interrupt mask. In the state in which the interrupt mask has been set, the bus I/F 201 does not output the interrupt signal. In other words, the bus I/F 201 enters a state of not outputting the interrupt 303 to the SoC 1 until the interrupt mask is cleared, even if input of the UART interrupt 206 or the power management circuit interrupt 502 is received.

The power management circuit I/F 203 is an interface circuit for connecting the power management circuit 5 to the I/O controller 2. Accordingly, the power management circuit 5 can input an interrupt signal to the SoC 1 via the I/O controller 2, which is a peripheral device. The UART 204 is a serial input/output device for receiving digital data from the sensor 6. The UART 204 is configured to output the UART interrupt 206 when digital data is received from the sensor 6. The UART 204 also includes a function of masking output of the interrupt signal, and the interrupt mask can be set or cleared due to the CPU 101 operating a mask register 205. While the interrupt mask is set, the UART 204 does not output the UART interrupt 206.

The power management circuit 5 is configured to output the power management circuit interrupt 502 when the power switch 7 is operated. The power management circuit 5 also includes a function of masking output of the interrupt signal, and the interrupt mask can be set or cleared due to the CPU 101 operating a mask register 501. While the interrupt mask is set, the power management circuit 5 does not output the power management circuit interrupt 502.

Processing Procedure

A processing procedure of the computer system according to the present embodiment will be described with reference to FIG. 3. While the computer system of the present embodiment is operating, the CPU 101 is in a state of executing this flow. Note that the processing described hereinafter is, for example, realized by the CPU 101 reading out the clock control program 401 to the RAM 4 and executing it.

First, in step S101, the CPU 101 initializes, to a predetermined value M (second value), a variable COUNT for counting the number of instances of the timer interrupt 105. Next, in step S102, the CPU 101 determines whether or not the timer interrupt 105 is in a state of having been input. If the timer interrupt 105 has not been input, the determination in step S102 is repeated, and the CPU 101 waits until the timer interrupt 105 is input. If the timer interrupt 105 has been input in step S102, the CPU 101 advances the processing to step S103.

In step S103, the CPU 101 decrements the variable COUNT for counting the number of instances of the timer interrupt 105 by 1 and advances to step S104. In step S104, the CPU 101 determines whether or not the value of the variable COUNT is zero. If the value is not zero, the CPU 101 returns the processing to step S102 and once again waits for input of the timer interrupt 105. If the value is zero, the CPU 101 advances the processing to step S105.

In step S105, the CPU 101 determines whether or not the bus clock generation circuit 107 has stopped driving. If the driving has not been stopped, the CPU 101 advances the processing to step S106, and if the driving has been stopped, the CPU 101 advances the processing to step S108.

In step S106, the CPU 101 executes clock stop processing, stops the driving of the bus clock generation circuit 107, stops the supply of the bus clock 301, and advances the processing to step S107. The details of step S106 will be described later with reference to FIG. 4A.

In step S107, the CPU 101 re-initializes (resets) the value of the variable COUNT to a predetermined value N (first value) and returns the processing to step S102. On the other hand, if it has been determined that the bus clock generation circuit 107 has stopped driving in step S105, the CPU 101 advances the processing to step S108, executes clock restart processing, restarts the driving of the bus clock generation circuit 107, restarts the supply of the bus clock 301, and advances the processing to step S109. The details of step S108 will be described later with reference to FIG. 4B.

In step S109, the CPU 101 re-initializes (resets) the value of the variable COUNT to the predetermined value M and returns the processing to step S102. Due to the above-described processing, the CPU 101 alternatingly and repeatedly stops and restarts the driving of the bus clock generation circuit 107 when the measuring of the predetermined time by the timer 104 is performed a predetermined number of times (M or N). Accordingly, the driving time of the bus clock generation circuit 107 is reduced as much as possible.

Clock Stop Processing

Next, a detailed processing procedure for clock stop processing (step S106) according to the present embodiment will be described with reference to FIG. 4A. Note that the processing described hereinafter is, for example, realized by the CPU 101 reading out the clock control program 401 to the RAM 4 and executing it.

In step S201, the CPU 101 operates the mask register 501 to set the interrupt mask of the power management circuit 5. This is done in order to perform control to prevent the bus I/F 201 from outputting the interrupt 303 in a state in which the supply of the bus clock 301 is stopped.

The operation of the UART 204 and the power management circuit 5 is independent from the state of the external bus 3. A state is entered in which the UART interrupt 206 and the power management circuit interrupt 502 are output when these devices receive input from the exterior, even if the supply of the bus clock 301 is stopped. Upon doing so, the bus I/F 201 attempts to output the interrupt 303 to the external bus 3, but when the interrupt 303 is output in the state in which the bus clock 301 is stopped, the bus circuit malfunctions in some cases. For this reason, it is necessary to perform an operation for masking interrupt output in order to prevent the bus I/F 201 from outputting the interrupt 303.

Next, in step S202, the CPU 101 operates the mask register 205 to set the interrupt mask of the UART 204. This is also processing for performing control to prevent the bus I/F 201 from outputting the interrupt 303, similarly to the processing of step S201. Furthermore, in step S203, the CPU 101 operates the mask register 202 to set the interrupt mask of the bus I/F 201. This is also processing for performing control to prevent the bus I/F 201 from outputting the interrupt 303, similarly to the processing of step S201.

Next, in step S204, the CPU 101 stops the bus clock generation circuit 107, stops the generation of the clock signal, and ends the processing. Accordingly, the supply of the bus clock 301 is stopped, and the external bus 3 enters a state in which the bus clock is stopped. Upon stopping the supply of the bus clock, a state will be entered in which the devices connected to the external bus 3 cannot be accessed, and therefore the CPU 101 needs to perform the stopping of the bus clock last.

Clock Restart Processing

Next, a detailed processing procedure for clock restart processing (step S108) according to the present embodiment will be described with reference to FIG. 4A. Note that the processing described hereinafter is, for example, realized by the CPU 101 reading out the clock control program 401 to the RAM 4 and executing it.

In step S301, the CPU 101 drives the bus clock generation circuit 107 to restart generation of the clock signal. Accordingly, supply of the bus clock 301 is restarted, and the external bus 3 enters a state in which it is supplied with the bus clock. Since the bus clock needs to be supplied in order for the CPU 101 to access a device connected to the external bus 3, supply of the bus clock needs to be performed first.

Next, in step S302, the CPU 101 operates the mask register 202 to clear the interrupt mask of the bus I/F 201, and advances the processing to step S303. In step S303, the CPU 101 operates the mask register 205 to clear the interrupt mask of the UART 204 and advances the processing to step S304.

In step S304, the CPU 101 operates the mask register 501 to clear the interrupt mask of the power management circuit 5 and ends the processing. Due to the clearing of the interrupt mask, the bus I/F 201 enters a state in which it is able to output the interrupt 303.

If the UART 204 or the power management circuit 5 has received input while the interrupt mask was set, the UART interrupt 206 or the power management circuit interrupt 502 is output when the interrupt mask is cleared. Since the bus clock 301 is in a state in which it is supplied at this time, the external bus 3 can operate normally and the bus I/F 201 can output the interrupt 303 and transmit an interrupt signal. Upon receiving input of the interrupt 303, the bus I/F 106 inputs the external bus interrupt 108 to the CPU 101 and the CPU 101 processes the interrupt.

Timing Chart

Next, the relationship between bus clock control according to the present embodiment and the output timing of the interrupt 303 in the case where input occurs from the exterior will be described with reference to FIGS. 5A and 5B. FIGS. 5A and 5B shows a relationship between input to the UART 204 and the stop state of the bus clock 301. The bus clock 301 repeats the supply state and the stop state based on the timer interrupt 105. Accompanying the stopping of the bus clock 301, a state is entered in which interrupt masks are set for the mask register 202 and the mask register 205.

FIG. 5A shows an example of a case in which the UART 204 receives data while the bus clock 301 is stopped. In this case, even if data is received, the UART 204 does not output the UART interrupt 206 immediately, but instead outputs it at a timing at which the bus clock 301 is restarted. Accordingly, the interrupt 303 is output at the same time as the restarting of the supply of the bus clock 301.

On the other hand, FIG. 5B shows an example of a case in which the UART 204 receives data at a timing when the bus clock 301 is being supplied. In this case, the UART 204 outputs the UART interrupt 206 immediately after the data is received, and thus the interrupt 303 is also output. FIGS. 5A and 5B shows a relationship between the UART 204 and the control of the present invention, but the relationship is exactly the same for the power management circuit 5 as well.

As described above, the computer system according to the present embodiment includes the SoC 1, which is a control apparatus, and the I/O controller 2, which is connected to the SoC 1 via a peripheral bus (external bus 3). Also, the SoC 1 includes the timer 104, which repeatedly measures a predetermined time, and the bus clock generation circuit 107, which supplies a clock to the I/O controller 2. Furthermore, the SoC 1 includes the CPU 101, which alternatingly stops and restarts the driving of the bus clock generation circuit 107 based on the measuring of the predetermined time performed by the timer 104. On the other hand, the I/O controller 2 includes an interrupt mask that restricts output of the interrupt signal to the SoC 1 via the peripheral bus. Also, when the driving of the bus clock generation circuit 107 is to be stopped, the SoC 1 sets the above-described interrupt mask, and when the driving of the bus clock generation circuit 107 is to be restarted, the SoC 1 cancels the above-described interrupt mask. Accordingly, the computer system to which the present invention has been applied can shorten the driving time for the clock generation circuit by stopping the bus clock of the peripheral bus, and thus the lifespan of the clock generation circuit can be kept long.

Figure 3:
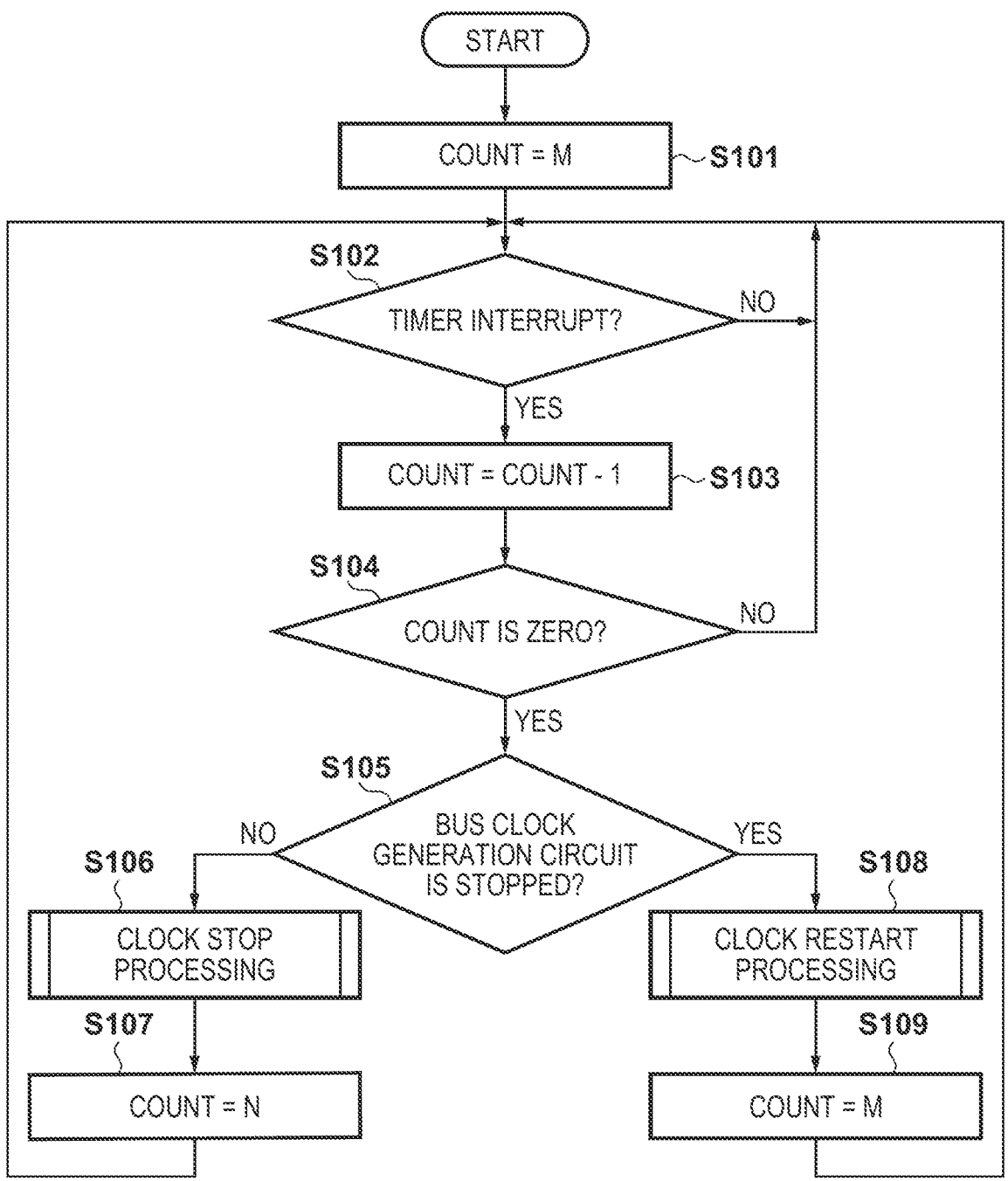
FIG. 3 is a flowchart of bus clock control according to an embodiment.

For example, the timer 104 sets the time interval for outputting the timer interrupt 105 to 4 milliseconds, sets the count value M for the number of instances of the timer interrupt in the flowchart shown in FIGS. 3 to 1, and sets the count value N to 4. In this case, the operation of stopping the bus clock 301 for 16 milliseconds after it is supplied for 4 milliseconds is repeated, and the driving time for the clock generation circuit 107 can be suppressed to 20% of the driving time for the computer system. Of course, this setting is exemplary and the present invention is not limited thereto.

Also, in the computer system to which the present invention is applied, it is possible to realize stopping of the bus clock and transmission of an interrupt signal also in a peripheral bus that does not include the function of automatically stopping the bus clock. Accordingly, it is possible to achieve both maintenance of the lifespan of the clock generation circuit and a state in which the computer system responds to input, and functionality is not impaired.

Note that in the above-described embodiment, the timer 104 was configured to output the interrupt signal each set time cycle, but similar effects can be obtained also with a circuit configured to output an interrupt signal upon the elapse of a designated time.

Furthermore, in the above-described embodiment, in the flowcharts shown in FIGS. 4A and 4B, the interrupt of the power management circuit 5 is first masked, and then the interrupt of the UART 204 is masked, but this configuration is merely an example. The sequence of the interrupt masks may be different from that of the present embodiment, and the present invention is not limited to this configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-105769 filed on May 29, 2017, which is hereby incorporated by reference herein in its entirety.

What is claimed is:

1. A computer system comprising:
   a timer configured to output a timer signal at a predetermined interval;
   a clock generation circuit configured to alternatingly supply or not supply a clock signal to a bus based on the timer signal output by the timer; and
   a controller configured to receive the clock signal via the bus, receive data from an external device while the clock signal from the clock generation circuit is stopped, and then output a predetermined signal related to the data received from the external device to the bus while the clock signal from the clock generation circuit is supplied.

2. The computer system according to claim 1, wherein, based on a number of the timer signals, the clock generation circuit is configured to supply or not supply the clock signal.

3. The computer system according to claim 1, further comprising a control unit configured to set an interrupt mask of the controller, which prohibits output of the predetermined signal from the controller to the bus, and, thereafter, the control unit is configured to set the clock generation circuit not to supply the clock signal in a case where the clock signal from the clock generation circuit is to be stopped.

4. The computer system according to claim 1, wherein the data is first data, wherein the external device is a first external device, wherein the predetermined signal is a first predetermined signal, wherein the controller is configured to receive second data from a second external device while the clock signal from the clock generation circuit is stopped, and then output a second predetermined signal related to the second data to the bus based on starting of supplying of the clock signal, wherein the second data is the first data or other than the first data, wherein the second external device is the first external device or other than the first external device, and wherein the second predetermined signal is the first predetermined signal or other than the first predetermined signal.

5. The computer system according to claim 1, wherein the data is first data, wherein the external device is a first external device, wherein the predetermined signal is a first predetermined signal, wherein the controller is configured to receive second data from a second external device while the clock signal from the clock generation circuit is supplied, and output a second predetermined signal related to the second data to the bus based on receiving the second data, wherein the second data is the first data or other than the first data, wherein the second external device is the first external device or other than the first external device, and wherein the second predetermined signal is the first predetermined signal or other than the first predetermined signal.

6. The computer system according to claim 1, wherein the predetermined signal is an interrupt signal.

7. The computer system according to claim 1, wherein the external device is a sensor.

8. The computer system according to claim 1, wherein the bus comprises a data line for transmitting data, an address line for transmitting an address, and an interrupt line for transmitting an interrupt.

9. The computer system according to claim 2,
   wherein, in a case where the clock signal from the clock generation circuit is to be stopped, a first value is set as a value to be compared with the number of timer signals, and
   wherein, in a case where the clock signal from the clock generation circuit is to be supplied, a second value that is different from the first value is set as the value to be compared with the number of timer signals.

10. The computer system according to claim 9, wherein the first value is greater than the second value.

11. The computer system according to claim 3,
    wherein, in a case where the clock signal from the clock generation circuit is to be supplied, the control unit is configured to set the clock generation circuit to supply the clock signal and, thereafter, the control unit is configured to cancel the set interrupt mask of the controller.

12. The computer system according to claim 11,
    wherein another external device is further connected to the controller,
    wherein the another external device is configured to input an interrupt signal to the bus via the controller, and
    wherein the control unit is configured to set or cancel an interrupt mask of the another external device in a case where the clock signal from the clock generation circuit is to be stopped or supplied.

13. A method for controlling a computer system including a timer configured to output a timer signal at a predetermined interval, the method comprising:
    alternatingly supplying or not supplying a clock signal to a bus based on the timer signal output by the timer; and
    receiving the clock signal via the bus, receiving data from an external device while the clock signal is stopped, and then outputting a predetermined signal related to the data received from the external device to the bus while the clock signal is supplied.

14. A non-transitory computer-readable storage medium storing a computer program for causing a computer to execute steps of a method for controlling a computer system including a timer configured to output a timer signal at a predetermined interval, the method comprising:
    alternatingly supplying or not supplying a clock signal to a bus based on the timer signal output by the timer; and
    receiving the clock signal via the bus, receiving data from an external device while the clock signal is stopped, and then outputting a predetermined signal related to the data received from the external device to the bus while the clock signal is supplied.

15. A computer system comprising a control apparatus and a peripheral device connected to the control apparatus via a bus,
    wherein the control apparatus includes:
    a timer configured to repeatedly measure a predetermined time;
    a clock generation circuit configured to supply a clock signal to the peripheral device; and
    a control unit configured to alternatingly stop and restart driving of the clock generation circuit based on the measuring of the predetermined time performed by the timer, wherein the peripheral device includes an interrupt mask configured to restrict output of an interrupt signal from the peripheral device to the control apparatus via the bus, wherein, in a case where the driving of the clock generation circuit is to be stopped, the control unit is configured to set the interrupt mask, and wherein, in a case where the driving of the clock generation circuit is to be restarted, the control unit is configured to cancel the interrupt mask.

* * * * *